United States Patent [19]
Uematsu

[11] Patent Number: 5,946,506
[45] Date of Patent: Aug. 31, 1999

[54] SINGLE LENS REFLEX CAMERA WITH ROTATABLE BUILT-IN FLASH

[75] Inventor: Kimio Uematsu, Fuji, Japan

[73] Assignee: Nikon Corporation, Tokyo, Japan

[21] Appl. No.: 09/020,024

[22] Filed: Feb. 6, 1998

[30] Foreign Application Priority Data

Feb. 7, 1997 [JP] Japan .................................. 9-025164

[51] Int. Cl.⁶ .................................................. G03B 17/24
[52] U.S. Cl. ........................................................ 396/177
[58] Field of Search .................................. 396/178, 177, 396/176

[56] References Cited

U.S. PATENT DOCUMENTS 4,796,034   1/1989   Leonard et al. ......................... 396/178
5,107,287   4/1992   Swayze .................................... 396/178

Primary Examiner—David M. Gray

[57] ABSTRACT

A single lens reflex camera includes a rotatable built-in flash unit. An optical member, such as a pentaprism, conducts light rays to an eyepiece unit. Pentaprism has a right roof surface, a left roof surface, and a third reflecting surface. Third reflecting surface enables light reflected by the roof surfaces to pass to the eyepiece unit. The built-in flash unit is rotatable between a housed position, in which a light emitting unit is housed within a camera body, and a use position, in which the light emitting unit projects from the camera body. The built-in flash unit rotates centered on a rotation axis that is parallel to a photographic optical axis, extending from the camera to a photographic object. When in the housed position, the light emitting unit is positioned along either the left or right surface of surface of the optical member.

17 Claims, 7 Drawing Sheets

SINGLE LENS REFLEX CAMERA WITH ROTATABLE BUILT-IN FLASH

CROSS-REFERENCE TO RELATED APPLICATIONS

This application is based upon and claims priority of Japanese Patent Application No. 09-025164, filed Feb. 7, 1997, the contents being incorporated herein by reference.

BACKGROUND OF THE INVENTION

The present invention relates to a camera having a built-in flash unit, and more particularly, the present invention relates to a built-in flash unit of a camera that rotates between a housed position and a use position.

FIGS. 7–9 (PRIOR ART) illustrate a prior art single lens reflex camera 40 having a built-in flash unit 50. As illustrated in FIG. 9 (PRIOR ART), built-in flash unit 50 includes a light emitting unit 51 housed and supported in an upper casing 52 and a lower casing 53. As illustrated in FIGS. 7 and 8 (PRIOR ART), camera 40 has a front surface side 42, a back surface side 44, a left side 47, and a right side 49. Upper casing 52 is rotatably supported on a shaft support unit (not shown) located near back surface side 44. As a result, flash unit 50 can be rotated by upper casing 52 between a housed position, within camera 40, as illustrated in FIG. 9 (PRIOR ART), and a use position, extending outside camera 40, as illustrated in FIG. 8 (PRIOR ART).

As illustrated in FIG. 9 (PRIOR ART), light emitting unit 51 includes a light source, such as a xenon tube 51a, that is protected from the outside environment by a protector 51c located in front of xenon tube 51a. A reflector 51b, located in light emitting unit 51, emits light to help ensure that illumination from xenon tube 51a is uniform.

A pentaprism 4 allows light which passes through a photographic lens 46 to pass through to a viewfinder eyepiece unit 70. Pentaprism 4 includes a first roof surface 4a, a second roof surface 4b, and a third reflecting surface 4c. Third reflecting surface 4c enables light reflected by roof surfaces 4a and 4b to pass to eyepiece unit 70.

Flash unit 50 is rotated by upper casing 52 to the housed position illustrated in FIG. 9 (PRIOR ART) when built-in flash unit 50 is not in use. As illustrated in FIG. 9 (PRIOR ART), when camera 40 is in the housed position, light emitting unit 51 is positioned along a front, top position of pentaprism 4. By engaging a release switch (not shown) or performing some other predetermined operation when camera 40 is in the housed position, upper case 52 rotates in a clockwise rotary direction with respect to camera 40 and flash unit 50 rotates to the use position illustrated in FIGS. 7 and 8 (PRIOR ART). By positioning flash unit 50 in the use position, a flash photography function of camera 40 is enabled.

A photographic optical axis for performing a photographic operation extends from camera 40 to a photographic subject. In prior art single lens reflex cameras, the shaft support unit extends from left side 47 to right side 49 in a direction perpendicular to the photographic optical axis. Flash unit 50 rotates about the shaft support unit at right angles to the photographic optical axis. As illustrated in FIG. 9 (PRIOR ART), when flash unit 50 is rotated to the housed position, light emitting unit 51 is positioned along a front top portion of pentaprism 4. As illustrated in FIGS. 8 and 9 (PRIOR ART), a protection member 61 is needed to protect light emitting unit 51 from being damaged when in the housed position. Protection member 61, located at an upper portion of front surface side 42 of camera 40, extends outward from front surface side 42, increasing the overall size of camera 40. This increased size of camera 40, particularly an increased depth, makes camera 40 less compact and portable, and more difficult to store.

In order to obtain a proper distribution of luminous intensity from light emitting unit 51, upper casing 52 must be fully rotated so that light emitting unit is parallel to the photographic optical axis. Therefore, if upper casing 52 is positioned at any point between the use and the housed position during a photographic operation, the luminous intensity is corrupted, which can result in improperly illuminated photographs and a lessening of picture quality.

BRIEF SUMMARY OF THE INVENTION

It is therefore an object of the present invention to provide a single lens reflex camera that efficiently utilizes available space to house a built-in flash unit.

It is a further object of the present invention to provide a single lens reflex camera that is more compact, portable and easier to store.

It is yet another object of the present invention to provide a single lens reflex camera that provides a uniform distribution of luminous intensity from a built-in flash unit at any position between a housed position and a use position.

It is a further object of the present invention to provide a single lens camera with a built-in flash unit similar to those of the prior art, while reducing the depth dimension of the camera body to a minimum.

Objects of the invention are achieved by a single lens reflex camera having a camera body extending in a photographic optical axis direction from a front surface to a back surface. A light emitting unit is rotatable between a housed position and a use position. An optical member has a first roof surface, a second roof surface, and a third reflecting surface. A rotation shaft rotatably supports the light emitting unit and extends parallel to the photographic optical axis. The light emitting unit is parallel at a cross-section of one of the first and second roof surfaces when in the housed position.

Further objects of the invention are achieved by a single lens reflex camera that has a camera body extending in a photographic optical axis direction from a front surface to a back surface. A light emitting unit, having a front surface, is rotatable between a housed position and a use position. An optical member has a first roof surface, a second roof surface, and a third reflecting surface. A rotation shaft rotatably supports the light emitting unit and extends parallel to the photographic optical axis. The light emitting unit has a front surface, such that when in the housed position, the light emitting unit is parallel at a cross-section of one of the first and second roof surfaces. In addition, the front surface is covered by the camera body.

Further objects of the invention are achieved by a single lens reflex camera having a camera body, with an eyepiece unit extending in a photographic optical axis direction from a front surface to a back surface. A light emitting unit, having a front surface, is rotatable between a housed position and a use position. An optical member has a first roof surface, a second roof surface, and a third reflecting surface. A rotation shaft rotatably supports the light emitting unit and extends parallel to the photographic optical axis. When in the housed position, the light emitting unit is parallel at a cross-section of one of the first and second roof surfaces, and the front surface is covered by the camera body. The optical member is formed by one or more mirrors such that the third reflecting surface enables light rays reflected from the first and second roof surfaces to pass to the eyepiece unit.

Further objects of the invention are achieved by a single lens reflex camera that has a camera body extending in a photographic optical axis direction from a front surface to a back surface. A light emitting unit is rotatable between a housed position and a use position. An optical member has a first roof surface, a second roof surface, and a third reflecting surface. A rotation shaft rotatably supports the light emitting unit and extends parallel to the photographic optical axis. The rotation shaft is positioned adjacent to the first roof surface and the light emitting unit is parallel at a cross-section of the second roof surface when in the housed position.

Still further objects of the invention are achieved by a single lens reflex camera that has a camera body extending in a photographic optical axis direction from a front surface to a back surface. A light emitting unit is rotatable between a housed position and a use position. An optical member has a first roof surface, a second roof surface, and a third reflecting surface. A rotation shaft rotatably supports the light emitting unit, and extends parallel to the photographic optical axis. The rotation shaft is positioned adjacent to the second roof surface and the light emitting unit is parallel at a cross-section of the second roof surface when in the housed position.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
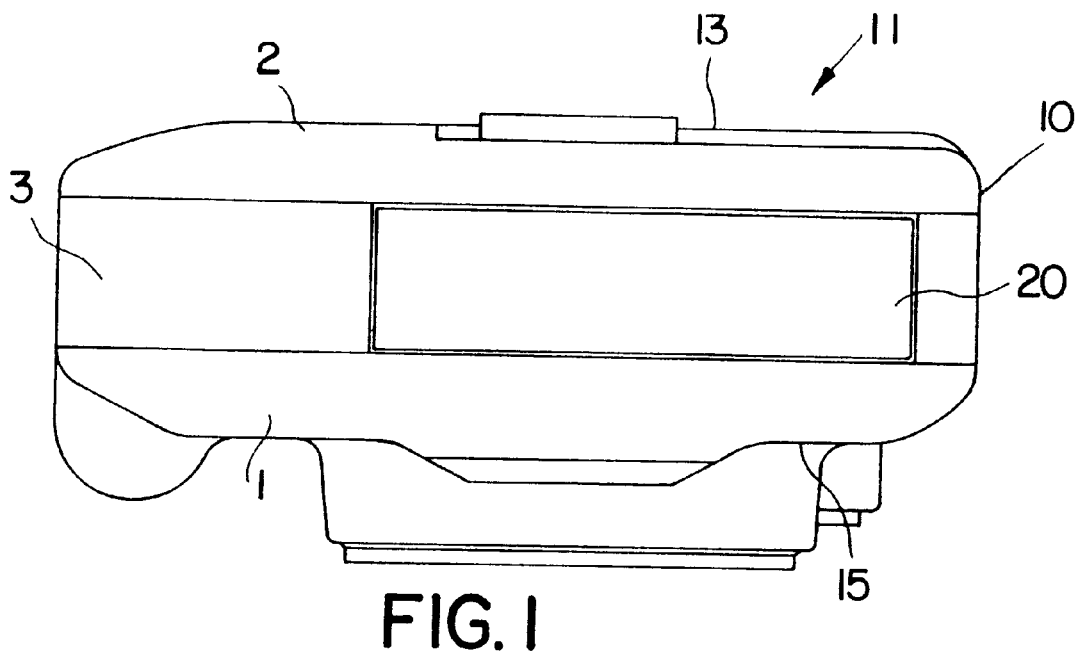
FIG. 1 is a top planar view of a single lens reflex camera with a built-in flash unit that is in a housed position, according to a preferred embodiment of the present invention.

Reference will now be made in detail to the preferred embodiments of the present invention, examples of which are illustrated in the accompanying drawings, wherein like reference numerals refer to like elements throughout.

Figure 2:
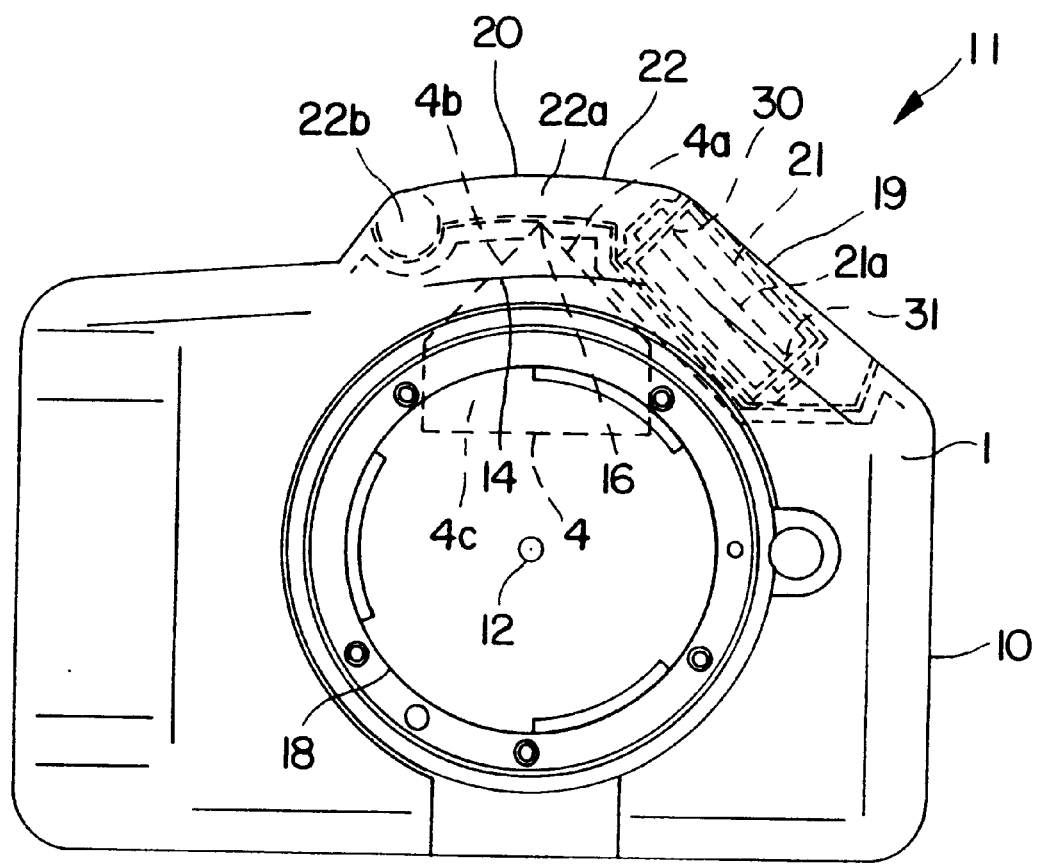
FIG. 2 is a front planar view of the single lens reflex camera of FIG. 1.

FIGS. 1–4 illustrate a single lens reflex camera 11 having a built-in flash unit 20 according to a preferred embodiment of the present invention. As illustrated in FIG. 1, a camera body 10 extends from a back portion 13 to a front portion 15 and includes a front cover 1, a rear cover 2 and a top cover 3. Front cover 1, rear cover 2, and top cover 3 form an outer shell of camera body 10. As illustrated in FIG. 2, a photographic optical axis 12 for performing a photographic operation extends from camera 11 to a photographic subject. Photographic optical axis 12 extends from back portion 13 to front portion 15 to the photographic subject. A viewfinder optical system of camera 11 includes a pentaprism 4 positioned at a central upper portion 14 of camera body 10. Pentaprism 4 has a right roof surface 4a extending downward at an angle from a top portion 16, and a left roof surface 4b extending downward at an angle opposite to right roof surface 4a from top portion 16. In addition, pentaprism 4 includes a third reflecting surface 4c. Light from the photographic subject emitted through a photographic lens 18 passes to an eyepiece lens (not shown) from roof surfaces 4a and 4b and third reflecting surface 4c. Third reflecting surface 4c enables light reflected by roof surfaces 4a and 4b to pass to the eyepiece unit.

Although pentaprism 4 is used in the camera to illustrate this preferred embodiment of the present invention, an optical member such as a mirror-penta may be used. Such optical members have two roof surfaces formed by mirrors, and a third reflecting surface, and perform a function similar to that of pentaprism 4.

Figure 4:
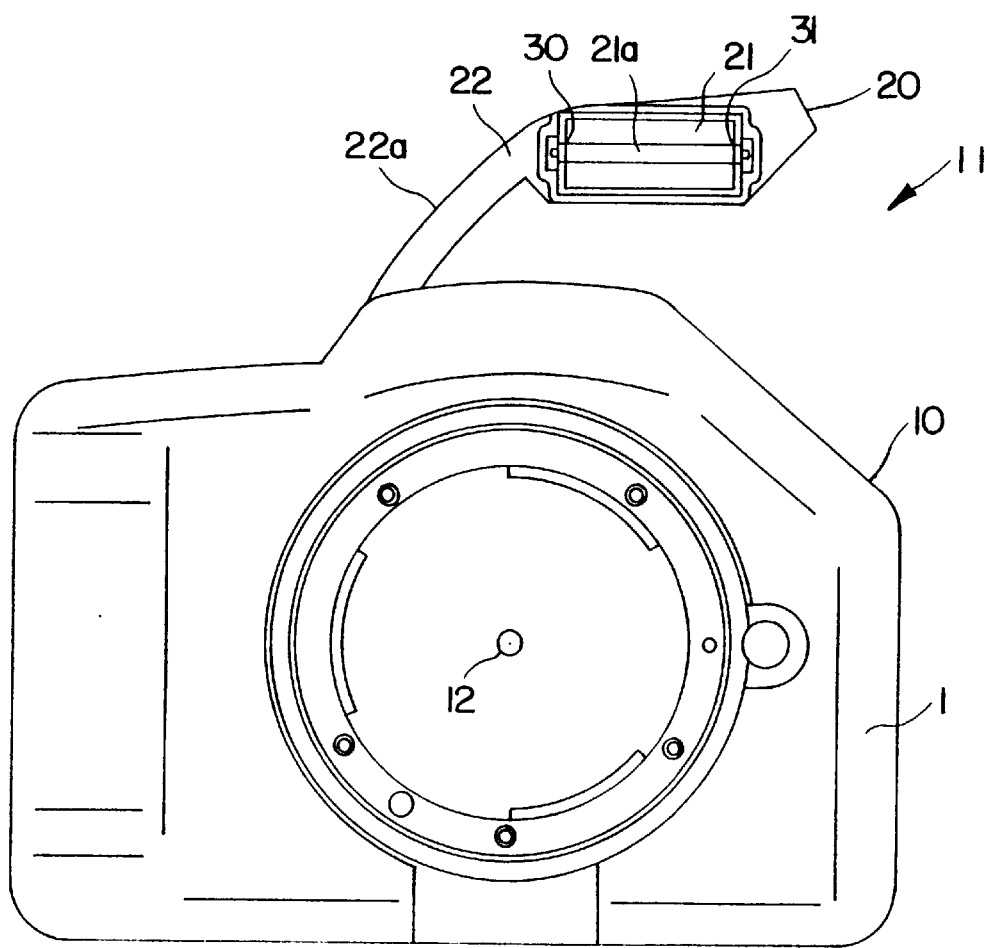
FIG. 4 is a front planar view of the single lens reflex camera of FIG. 3.

As illustrated in FIG. 2, built-in flash unit 20 is located at a top portion 19 of camera body 10. A light emitting unit 21 of built-in flash unit 20 has a xenon tube 21a, a reflector, and a protector (not shown). Xenon tube 21a extends from a first end 30 to a second end 31. A support unit 22 has a top case and a bottom case (not shown) to support light emitting unit 21. As illustrated in FIGS. 2 and 4, support unit 22 includes an arm portion 22a. A front end of arm portion 22a is supported by and rotatably centered on a rotation shaft 22b fixedly positioned within camera body 10. Rotation shaft 22b is located at an upper side of left roof surface 4b of pentaprism 4, and extends from back portion 13 to front portion 15 of camera body 10, in a direction parallel to photographic optical axis 12.

Figure 3:
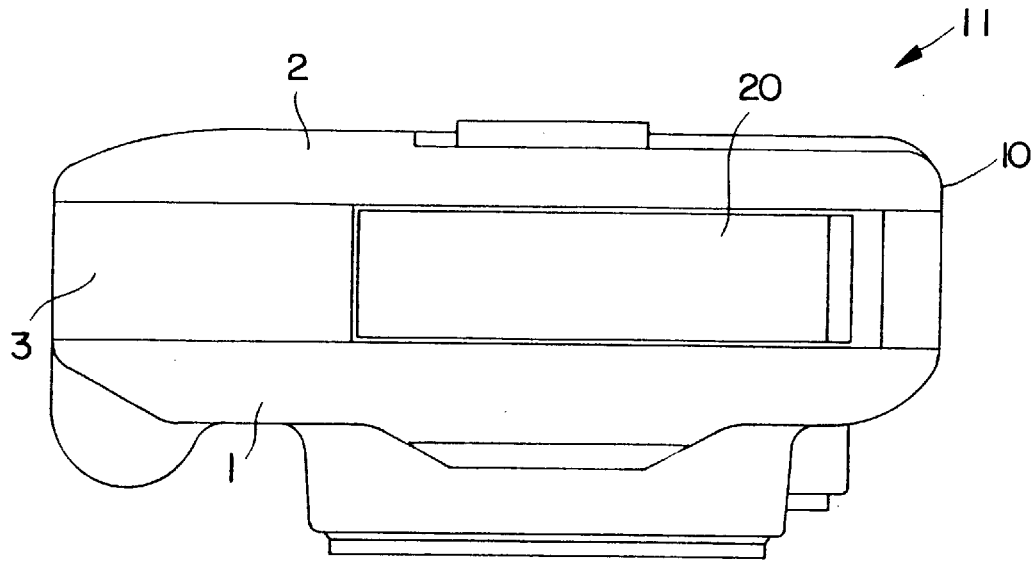
FIG. 3 is a top planar view of a single lens reflex camera with a built-in flash unit that is in a use position.

When in a housed position, as illustrated in FIGS. 1 and 2, built-in flash unit 20 is rotated about rotation shaft 22b to be positioned within camera body 10. When in a use position, as illustrated in FIGS. 3 and 4, built-in flash unit 20 is rotated about rotation shaft 22b to extend away from and above camera body 10.

Support unit 22 is normally urged in a counter-clockwise rotary direction, from the housed position illustrated in FIG. 2, to the use position illustrated in FIG. 4, by an urging mechanism (not shown). When in the housed position, built-in flash unit 20 is prevented from rotating in a counter-clockwise direction to the use position by a stop mechanism (not shown). As illustrated in FIG. 1, when in the housed position and viewed from above camera 11, built-in flash unit 20 is rectangular in shape, and is approximately centrally positioned between back portion 13 and front portion 15 of camera body 10.

Figure 6:
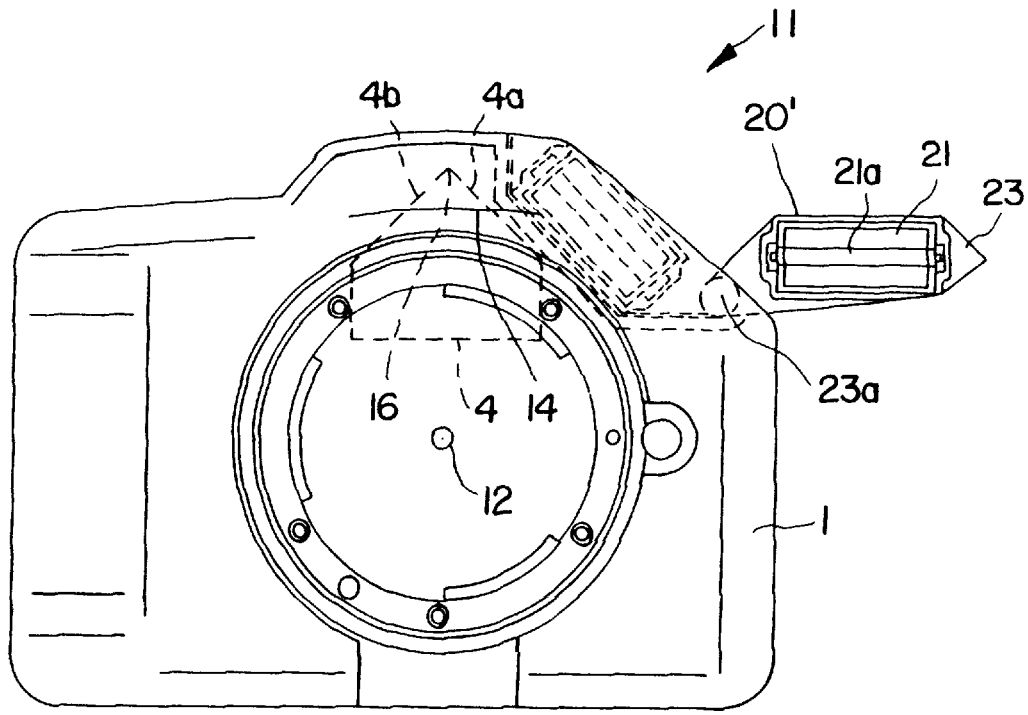
FIG. 6 is a front planar view of the single lens reflex camera of FIG. 5.
Figure 6A:
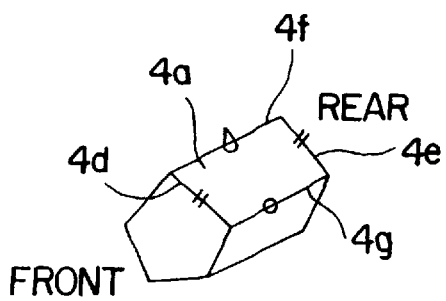
FIGS. 6A, 6B, and 6C are perspective views of a pentaprism for a camera according to a preferred embodiment of the present invention.
Figure 6B:
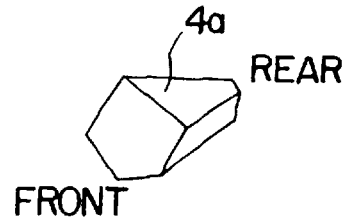
Figure 6C:
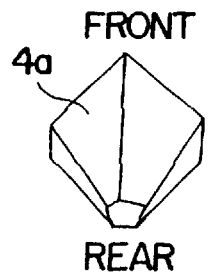

When viewed from front portion 15 of camera body 10, pentaprism 4 appears to have a shape illustrated in FIG. 6A, with right roof surface 4a having a front edge 4d parallel to a rear edge 4e, and a top edge 4f perpendicular to a bottom edge 4g. In fact, right roof surface 4a of pentaprism 4 has an oblique shape, as more clearly illustrated in FIGS. 6B and 6C. FIG. 6B is a perspective view of pentaprism 4 extending from a front surface to a rear surface. FIG. 6C is a perspective view of pentaprism 4 extending from the rear surface to the front surface. As illustrated, right roof surface 4a is inclined so that while front edge 4d is parallel to rear edge 4e, top edge 4f and bottom edge 4g are oblique in a direction towards the center of pentaprism 4. As a result, as illustrated in FIGS. 6B and 6C, when viewed from a front surface towards a rear surface, right roof surface 4a is oblique in the direction of the center of pentaprism 4. FIG. 6C illustrates the oblique shape of pentaprism 4 when viewed from the rear surface towards the front surface. Front surface of pentaprism 4 is viewed as a cross section of pentaprism 4 when cut in a direction perpendicular to photographic optical axis 12.

As illustrated in FIGS. 1 and 2, when in the housed position, built-in flash unit 20 is positioned between front cover 1 and back cover 2 of the camera body 10. In addition, top portion 16 of pentaprism 4 is positioned between rotation shaft 22b and light emitting unit 21. In the housed position, light emitting unit 21 is positioned along right roof surface 4a so that xenon tube 21a of light emitting unit 21 is approximately parallel to right roof surface 4a at cross sections of pentaprism 4 from front surface to rear surface of pentaprism 4. In other words, light emitting unit 21 is not parallel to complete right roof surface 4a, but is parallel at cross sectional surfaces of pentaprism 4.

When built-in flash 20 is in the housed position, as illustrated in FIGS. 1 and 2, a light emitting side of light emitting unit 21 is covered by front cover 1. In addition, when built-in flash 20 is in the housed position, xenon tube 21a does not emit light if photography is performed.

When a predetermined actuation is performed in which flash unit 20 is to be used, the engagement between the above-mentioned stop member and support unit 22 is disconnected.

Due to the resulting urging force of the urging mechanism, flash unit 20 rotates in the counter-clockwise direction, centered on the rotation shaft 22b to the use position. When built-in flash 20 is in the use position, arm portion 22a of support unit 22 extends obliquely, and xenon tube 21a is positioned so that first end 30 extends horizontally to second end 31, perpendicular to the photographic optical axis. When built-in flash unit 20 is in the use position, xenon tube 21a emits a flash of light simultaneously with a shutter release, and flash photography is performed.

When built-in flash 20 is in the use position, an operator can cause built-in flash unit 20 to rotate clockwise to the housed position by manually pushing light emitting unit 21 downward.

In a preferred embodiment of the present invention described above, built-in flash unit 20 rotates centered on rotation shaft 22b. Rotation shaft 22b is parallel to photographic optical axis 12. In the housed position, light emitting unit 21 is positioned along the right roof surface 4a of pentaprism 4.

In a prior art single lens reflex camera, although the roof surfaces of the pentaprism are comparatively steeply sloping surfaces, prior art light emitting units are not designed to take advantage of space that is available above the roof surfaces. The preferred embodiments of the present invention make efficient use of the space by locating light emitting unit 21 of flash unit 20 along roof surface 4a of pentaprism 4. As a result, light emitting unit 21 does not project from the front portion 15 of the camera body. Moreover, because light emitting unit 21 is protected by being covered by front cover 1 of camera body 10 when flash unit 20 is in the housed position, it is not necessary to include a protection member to protect light emitting unit 21. By eliminating the protection member, a distance that camera body 10 extends from back portion 13 to front portion 15 is decreased, whether in the housed position or the use position. Therefore, the preferred embodiments of the present invention provide a single lens reflex camera 11 with a built-in flash unit 20 that is more compact, portable and easier to store. Moreover, because an optical axis of light emitting unit 21 can be kept at a distance from photographic optical axis 12, there is no impairment of a red eye reduction function of the camera.

Figure 7:
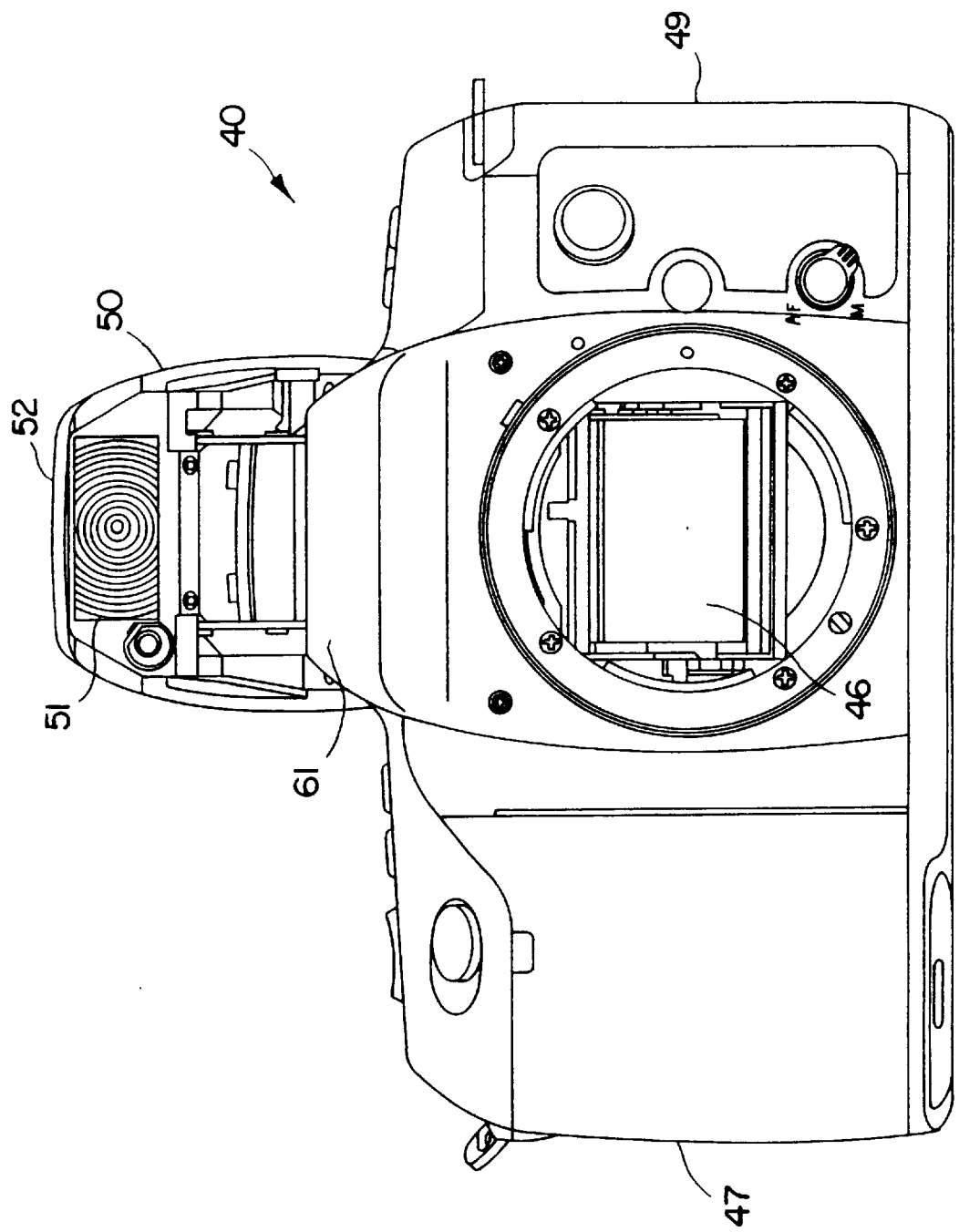
FIG. 7 (PRIOR ART) is a front planar view of a prior art single lens reflex camera with a built-in flash unit that is in a use position.
Figure 8:
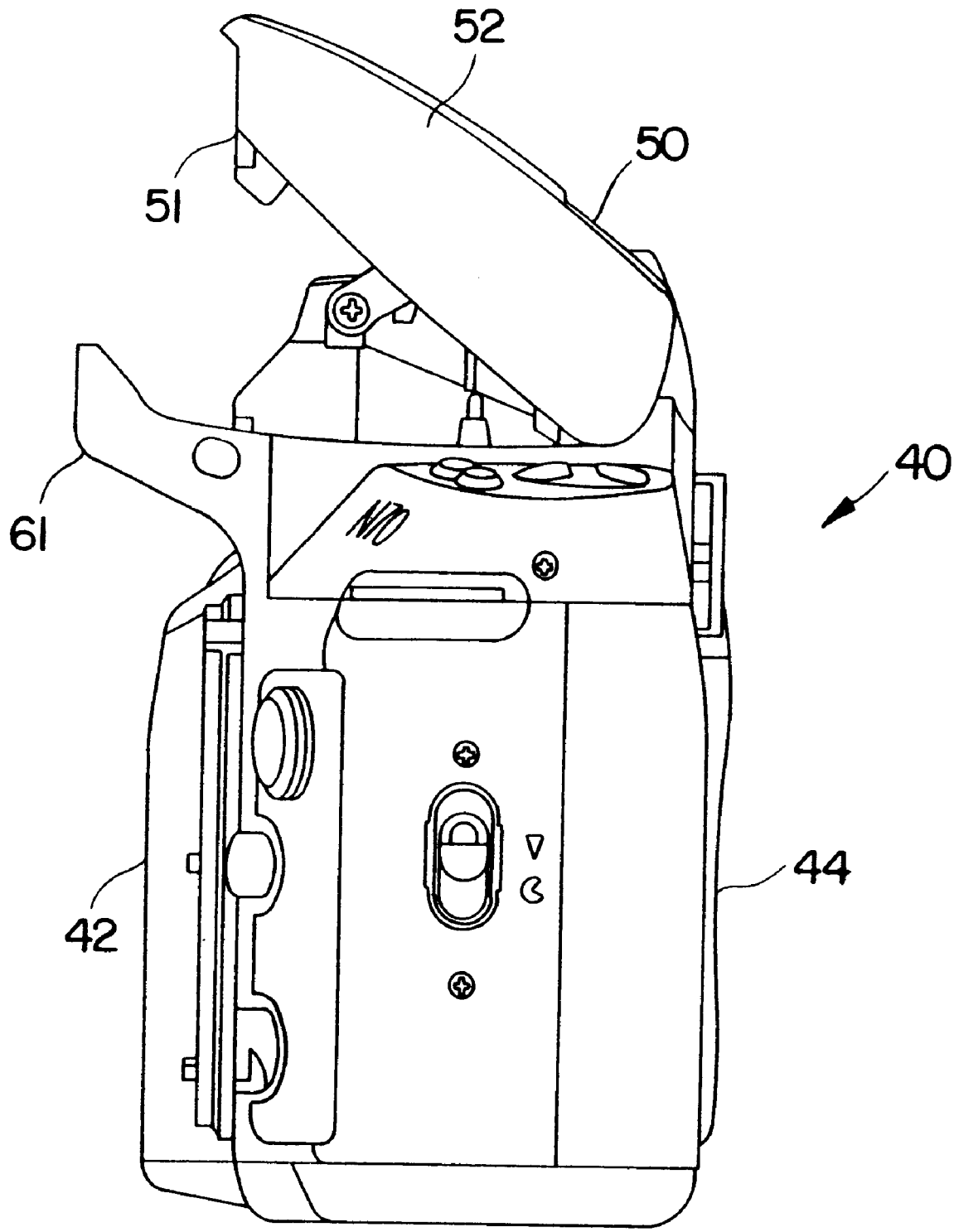
FIG. 8 (PRIOR ART) is a side view of the prior art single lens reflex camera of FIG. 7.
Figure 9:
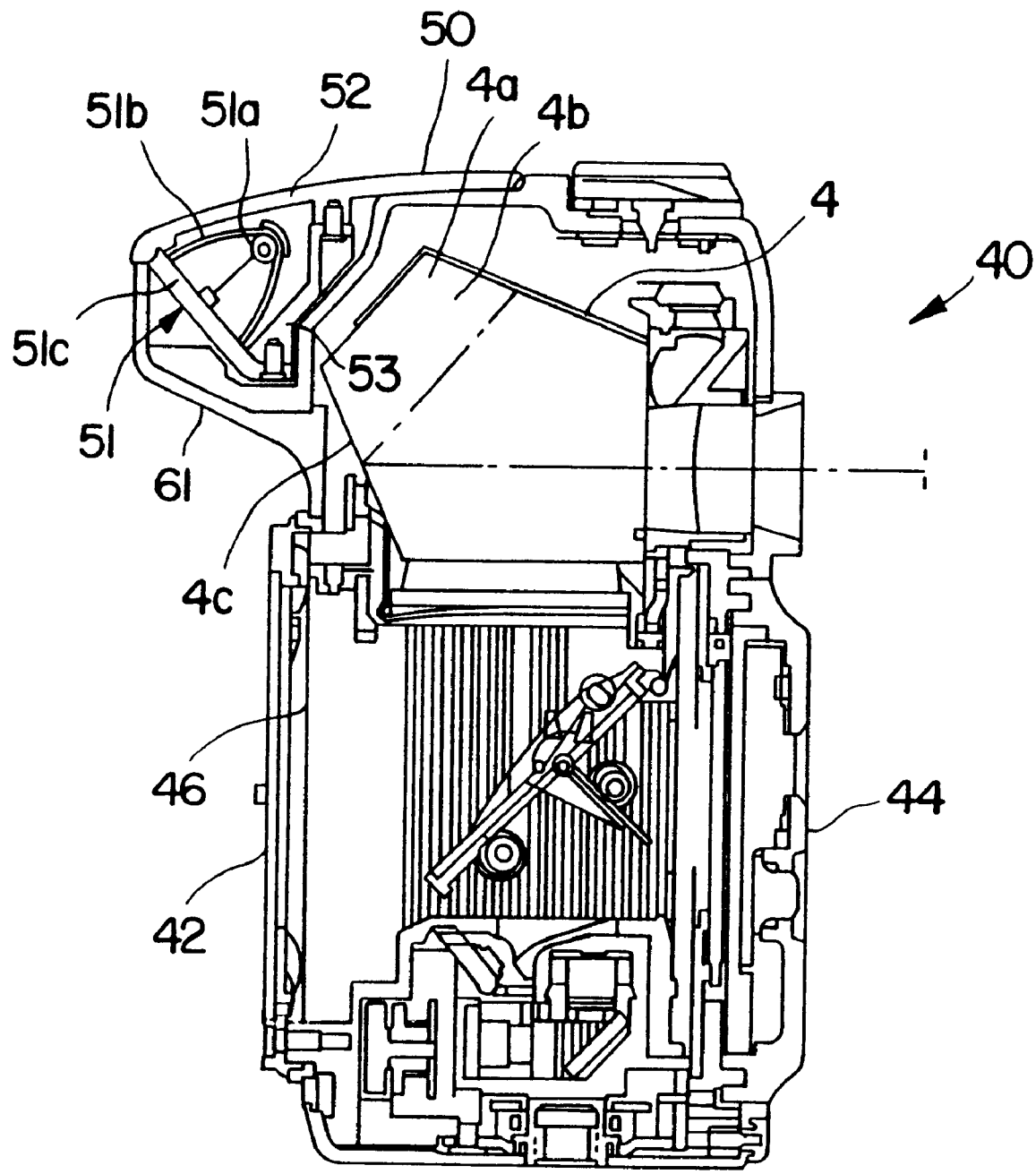
FIG. 9 (PRIOR ART) is a side view of a cross section of the prior art single lens reflex camera of FIG. 7.

Finally, because prior art light emitting unit 51, illustrated in FIGS. 7–9 (PRIOR ART), rotates around a rotational axis that is perpendicular to the photographic optical axis, pop-up positions of built-in flash unit 50 in which there is an appropriate distribution of luminous intensity from xenon tube 51a to the photographic subject is limited. Because rotation shaft 22 in the preferred embodiments of the present invention is parallel to the optical axis, light emitting unit 21 is normally facing the photographic subject at any position between and including the housed position and the use position. As a result, distribution of luminous intensity does not change with respect to some degree of displacement of support unit 22. Accordingly, even when light emitting unit 21 is in the use position and rotated in a clockwise direction, such as when inadvertently displaced by a peak of a photographer's cap, properly illuminated photographs are nonetheless obtained.

Figure 5:
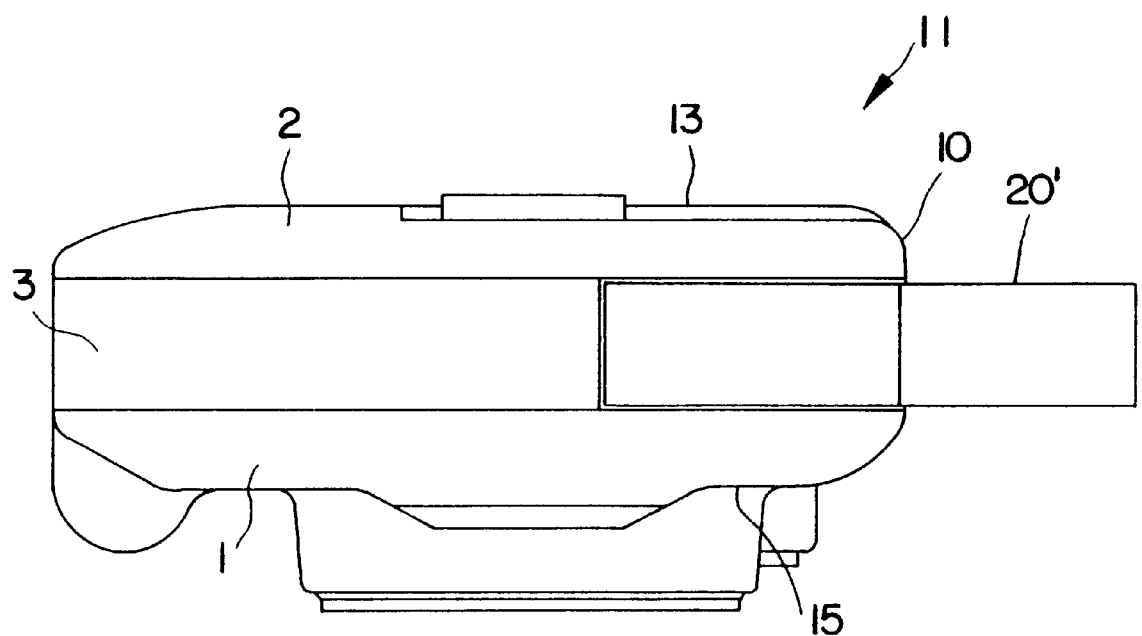
FIG. 5 is a top planar view of a single lens reflex camera with a built-in flash unit that is in a use position, according to a preferred embodiment of the present invention.

FIGS. 5 and 6 illustrate a single lens reflex camera 12 according to a second embodiment of the present invention. In FIGS. 5 and 6, the same symbols and reference numerals are used to indicate the same elements as for the camera of FIGS. 1–4.

As illustrated in FIGS. 5 and 6, a camera body 10 extends from a back portion 13 to a front portion 15 and includes a front cover 1, a rear cover 2 and a top cover 3. Front cover 1, rear cover 2, and top cover 3 form an outer shell of camera body 10. A photographic optical axis 12 for performing a photographic operation extends from camera 11 to a photographic subject. Photographic optical axis extends to the photographic subject from the back portion 13 to the front portion 15 of camera body 10. A viewfinder optical system includes a pentaprism 4 positioned at a central upper portion 14 of camera body 10. Pentaprism 4 has a right roof surface 4a extending downward at an angle from a top portion 16, and a left roof surface 4b extending downward at an angle opposite to right roof surface 4a from top portion 16. In addition, pentaprism includes a third reflecting surface 4c.

As illustrated in FIG. 6, a built-in flash unit 20' has a light emitting unit 21 similar to the above-mentioned light emitting unit, and a support unit 23 which supports light emitting unit 21. An end of support unit 23 is rotatably supported by a rotation shaft 23a in camera body 10 positioned near right roof surface 4a of pentaprism 4. Rotation shaft 23a extends from back portion 13 to front portion 15 of camera body 10, in a direction parallel to photographic optical axis 12. Support unit 23 is normally urged in a clockwise rotation direction by an urging mechanism (not shown). When flash unit 20' is in a housed position, illustrated in FIG. 6 by broken lines, rotation in a counter-clockwise direction is prevented by a stop mechanism (not shown).

When built-in flash unit 20' is in the housed position, illustrated in FIG. 6 by broken lines, light emitting unit 21 is located along right roof surface 4a so that xenon tube 21a is approximately parallel to right roof surface 4a at cross sections of pentaprism 4 from front surface to rear surface of pentaprism 4. In other words, light emitting unit 21 is not parallel to the complete right roof surface, but is parallel at cross sectional surfaces of pentaprism 4. In addition, light emitting unit 21 is covered by front cover 1.

When the engagement of the above-mentioned stop member and support unit 23 is disconnected by a predetermined actuation, built-in flash unit 20' rotates clockwise centered on rotation shaft 23a. Due to the urging force of the urging mechanism, support unit 23 becomes positioned in a use position, illustrated in FIG. 6 by solid lines. Rotation of support unit 23 is stopped by a stop mechanism (not shown). When support unit 23 is positioned in the use position, xenon tube 21a extends in a horizontal direction.

In the preferred embodiment of the present invention illustrated in FIGS. 5 and 6, single lens reflex camera 11 makes efficient use of space above roof surface 4a by locating light emitting unit 21 of flash unit 20' along roof surface 4a of pentaprism 4. As a result, light emitting unit 21 does not project from front portion 15 of camera body 10. Moreover, because light emitting unit 21 is protected by being covered by front cover 1 of camera body 10 when flash unit 20' is in the housed position, it is not necessary to include a protection member to protect light emitting unit 21. By eliminating the protection member, a distance that camera body 10 extends from back portion 13 to front portion 15 is decreased, whether in the housed position or the use position. Therefore, the above-described preferred embodiments of the present invention provide a single lens reflex camera 11 with a built-in flash unit 20' that is more compact, portable and easier to store. Moreover, because an optical axis of light emitting unit 21 can be kept at a distance from photographic optical axis 12, there is no impairment of a red eye reduction function of the camera.

Finally, since rotation shaft 22 is parallel to photographic optical axis 12, light emitting unit 21 is normally facing the photographic subject at any position between and including the housed position and the use position. As a result, distribution of luminous intensity does not change with respect to some degree of displacement of support unit 23. Accordingly, even when light emitting unit 21 is in the use position and rotated in a clockwise direction, such as when inadvertently displaced by a peak of a photographer's cap, properly illuminated photographs are nonetheless obtained.

While the description of the preferred embodiments of the present invention has been made in reference to a single lens reflex camera, it is understood that the invention is not limited to use in single lens reflex cameras. Objects of the present invention, including providing a uniform distribution of luminous intensity, minimizing the depth dimension of the camera, and providing a camera that is more compact, portable and easy to store without impairing a red eye reduction function may also be achieved in other cameras having a built-in flash unit, including digital cameras and the like.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A single lens reflex camera having a camera body extending in a photographic optical axis direction from a front surface to a back surface, and a light emitting unit rotatable between a housed position and a use position, comprising:

an optical member having a first roof surface, a second roof surface, and a third reflecting surface; and a rotation shaft to rotatably support the light emitting unit and extending parallel to the photographic optical axis, wherein the light emitting unit is parallel at a cross-section of one of the first and second roof surfaces when in the housed position, wherein the optical member is a pentaprism.

2. A single lens reflex camera of claim 1, wherein the rotation shaft is positioned adjacent to the roof surface not cross-sectionally parallel to the light emitting unit.

3. A single lens reflex camera of claim 1, wherein the rotation shaft is positioned adjacent to the roof surface cross-sectionally parallel to the light emitting unit.

4. A single lens reflex camera of claim 1, wherein the light emitting unit has a front surface covered by the camera body when the light emitting unit is in the housed position.

5. A single lens reflex camera having a camera body extending in a photographic optical axis direction from a front surface to a back surface, and a light emitting unit rotatable between a housed position and a use position, comprising:

an optical member having a first roof surface, a second roof surface, and a third reflecting surface;

a rotation shaft to rotatably support the light emitting unit and extending parallel to the photographic optical axis; and an eyepiece unit, wherein the optical member is formed by a mirror such that the third reflecting surface enables light rays reflected from the first and second roof surfaces to pass to the eyepiece unit, and the light emitting unit is parallel at a cross-section of one of the first and second roof surfaces when in the housed position.

6. A single lens reflex camera having a camera body extending in a photographic optical axis direction from a front surface to a back surface, and a light emitting unit, having a front surface, rotatable between a housed position and a use position, comprising:

an optical member having a first roof surface, a second roof surface, and a third reflecting surface; and a rotation shaft to rotatably support the light emitting unit and extending parallel to the photographic optical axis, wherein, when in the housed position, the light emitting unit is parallel at a cross-section of one of the first and second roof surfaces, and the front surface of the light emitting unit is covered by the camera body, and wherein the optical member is a pentaprism.

7. A single lens reflex camera of claim 6, wherein the rotation shaft is positioned along the other one of the first and second roof surfaces.

8. A single lens reflex camera of claim 6, wherein the rotation shaft is positioned along one of the first and second roof surfaces.

9. A single lens reflex camera having a camera body extending in a photographic optical axis direction from a front surface to a back surface, and a light emitting unit, having a front surface, rotatable between a housed position and a use position, comprising:

an optical member having a first roof surface, a second roof surface, and a third reflecting surface; and a rotation shaft to rotatably support the light emitting unit and extending parallel to the photographic optical axis; and an eyepiece unit, wherein, when in the housed position, the light emitting unit is parallel at a cross-section of one of the first and second roof surfaces, and the front surface of the light emitting unit is covered by the camera body, and the optical member is formed by a mirror such that the third reflecting surface enables light rays reflected from the first and second roof surfaces to pass to the eyepiece unit.

10. A single lens reflex camera having a camera body, with an eyepiece unit extending in a photographic optical axis direction from a front surface to a back surface, and a light emitting unit, having a front surface, and rotatable between a housed position and a use position, comprising:

an optical member having a first roof surface, a second roof surface, and a third reflecting surface; and a rotation shaft to rotatably support the light emitting unit and extending parallel to the photographic optical axis, wherein when in the housed position, the light emitting unit is parallel at a cross-section of one of the first and second roof surfaces, and the front surface of the light emitting unit is covered by the camera body, and wherein the optical member is formed by a mirror such that the third reflecting surface enables light rays reflected from the first and second roof surfaces to pass to the eyepiece unit.

11. A single lens reflex camera of claim 10, wherein the rotation shaft is positioned along the other one of the first and second roof surfaces.

12. A single lens reflex camera of claim 10, wherein the rotation shaft is positioned along one of the first and second roof surfaces.

13. A single lens reflex camera of claim 10, wherein the optical member is a pentaprism.

14. A single lens reflex camera having a camera body extending in a photographic optical axis direction from a front surface to a back surface, and a light emitting unit rotatable between a housed position and a use position, comprising:

an optical member having a first roof surface, a second roof surface, and a third reflecting surface; and a rotation shaft to rotatably support the light emitting unit and extending parallel to the photographic optical axis, wherein the rotation shaft is positioned adjacent to the first roof surface and the light emitting unit is parallel at a cross-section of the second roof surface when in the housed position, and wherein the optical member is a pentaprism.

15. A single lens reflex camera of claim 14, wherein the light emitting unit has a front surface that is covered by the camera body when the light emitting unit is in the housed position.

16. A single lens reflex camera having a camera body extending in a photographic optical axis direction from a front surface to a back surface, and a light emitting unit rotatable between a housed position and a use position, comprising:

an optical member having a first roof surface, a second roof surface, and a third reflecting surface; and a rotation shaft to rotatably support the light emitting unit and extending parallel to the photographic optical axis, wherein the rotation shaft is positioned adjacent to the second roof surface and the light emitting unit is parallel at a cross-section of the second roof surface when in the housed position, and wherein the optical member is a pentaprism.

17. A single lens reflex camera of claim 16, wherein the light emitting unit has a front surface that is covered by the camera body when the light emitting unit is in the housed position.

* * * * *